(12) United States Patent
Kendzia, III et al.

(10) Patent No.: US 12,362,593 B2
(45) Date of Patent: Jul. 15, 2025

(54) STATIC TRANSFER SWITCHES WITH INTELLIGENT BYPASS AND REMOVABLE POWER STAGES

(71) Applicant: ABB Schweiz AG, Baden (CH)

(72) Inventors: Thomas Anthony Kendzia, III, Rockville, VA (US); Veerakumar Bose, Henrico, VA (US); Christopher Alan Belcastro, Henrico, VA (US)

(73) Assignee: ABB Schweiz AG, Baden (CH)

( * ) Notice: Subject to any disclaimer, the term of this patent is extended or adjusted under 35 U.S.C. 154(b) by 71 days.

(21) Appl. No.: 18/503,476

(22) Filed: Nov. 7, 2023

(65) Prior Publication Data

US 2025/0149913 A1   May 8, 2025

(51) Int. Cl.
*H02J 4/00* (2006.01)
*H01H 9/54* (2006.01)
*H02J 9/06* (2006.01)
*H01H 9/16* (2006.01)

(52) U.S. Cl.
CPC ............ *H02J 9/068* (2020.01); *H01H 9/542* (2013.01); *H01H 9/547* (2013.01); *H01H 9/548* (2013.01); *H02J 9/062* (2013.01); *H01H 9/16* (2013.01)

(58) Field of Classification Search
CPC .................................. H02J 4/00; H02J 9/068
See application file for complete search history.

(56) References Cited

U.S. PATENT DOCUMENTS

| 10,001,825 | B2* | 6/2018 | Morales | H02J 9/04 |
| 2015/0214779 | A1* | 7/2015 | Tomassi | H02J 9/061 307/65 |
| 2016/0197483 | A1* | 7/2016 | Steinert | H02J 3/0073 307/18 |
| 2020/0091761 | A1 | 3/2020 | Tomassi | |

FOREIGN PATENT DOCUMENTS

| CN | 207637657 U | 7/2018 |
| CN | 216056470 U | 3/2022 |

OTHER PUBLICATIONS

European Office Action for Application No. 24211520.2, dated Apr. 29, 2025, 12 pages.

* cited by examiner

*Primary Examiner* — Jared Fureman
*Assistant Examiner* — Esayas G Yeshaw
(74) *Attorney, Agent, or Firm* — McCarter & English, LLP

(57) ABSTRACT

A method operable by a controller of a static transfer switch (STS) is provided. The STS includes first and second inputs selectively coupled with first and second power sources via first and second circuit breakers, respectively, an output coupled with a load, first and second bypass breakers selectively coupling the first and second inputs, respectively, with the output, at least one removable power stage module including first and second power stages configured to conduct electrical power when active, first and second contactors selectively coupling the first and second inputs with the first and second power stages, respectively, and a load switch selectively coupling the first and second power stages with the output. The method includes modifying an operating state of the first and second contactors and the first and second power stages to implement a bypass operation and an (Continued)

un-bypass operation of the STS in response to a trigger condition.

20 Claims, 13 Drawing Sheets

STATIC TRANSFER SWITCHES WITH INTELLIGENT BYPASS AND REMOVABLE POWER STAGES

BACKGROUND

The field of the disclosure relates to static transfer switches, and in particular, to static transfer switches having removable power stages and control systems that coordinate bypass and un-bypass activities for the static transfer switches.

A static transfer switch (STS) is a device that is designed to transfer from supplying a load via a preferred power source to supplying the load via an alternate power source when the power quality of the preferred power source is deemed unacceptable for the load. STS power stages use thyristors or other types of solid-state devices as the main switching device, which do not provide galvanic isolation to service personnel during servicing operations at the STS. Conventional STSs therefore have used manually operated switches or circuit breakers to bypass the STS power stages.

Problems arise, however, when operator errors during bypass and un-bypass operations result in a power loss at a critical load supplied by the STS. Further, typical STSs may require complicated electrical or mechanical key interlocking schemes that prevent powering the load across multiple sources (e.g., when more than one bypass breaker is closed at the same time) when transitioning the STS into and out of bypass. A significant amount of area may still be needed in the STS to access and operate the mechanical key interlocking schemes and the additional breakers and/or circuits used to implement bypass operations on a typical STS. Further still, it would be desirable to utilize removable power stages for the STS without disassembling the STS, as this would enable the power stages to be easily replaced or serviced while the STS is bypassed.

Thus, it is desirable to improve the operation and performance of STSs for implementing bypass functionality and serviceability in STSs.

BRIEF DESCRIPTION

In one aspect, a static transfer switch is provided. The static transfer switch includes a chassis, first and second inputs configured to selectively couple with first and second power sources via first and second circuit breakers, respectively, an output configured to couple with a load, first and second bypass breakers configured to selectively couple the first and second inputs, respectively, with the output, and a plurality of chassis connectors. The static transfer switch further includes at least one removable power stage module comprising first and second power stages configured to conduct electrical power when active, and a plurality of power stage connectors configured to removably couple with the plurality of chassis connectors. The static transfer switch further includes at least one automatic barrier assembly sized to accept the at least one removable power stage module, the at least one automatic barrier assembly configured to actuate and cover the plurality of chassis connectors in response to the at least one removable power stage module being removed from the at least one automatic barrier assembly, and to actuate and uncover the plurality of chassis connectors in response to the at least one removable power stage module being installed in the at least one automatic barrier assembly. The static transfer switch further includes first and second contactors, the first contactor configured to selectively couple the first input with the first power stage, and the second contactor configured to selectively couple the second input with the second power stage, a load switch configured to selectively couple the first and second power stages with the output via the at least one of the plurality of chassis connectors, and at least one controller configured to modify an operating state of the first and second contactors and the first and second power stages.

In another aspect, a method operable by at least one controller of a static transfer switch is provided. The static transfer switch includes first and second inputs selectively coupled with first and second power sources via first and second circuit breakers, respectively, an output coupled with a load, first and second bypass breakers selectively coupling the first and second inputs, respectively, with the output, at least one removable power stage module including first and second power stages configured to conduct electrical power when active, first and second contactors selectively coupling the first and second inputs with the first and second power stages, respectively, and a load switch selectively coupling the first and second power stages with the output. The method includes modifying an operating state of the first and second contactors and the first and second power stages to automatically implement a bypass operation and an un-bypass operation of the static transfer switch in response to at least one trigger condition.

BRIEF DESCRIPTION OF DRAWINGS

These and other features, aspects, and advantages of the present disclosure will become better understood when the following detailed description is read with reference to the accompanying drawings in which like characters represent like parts throughout the drawings.

Figure 1:
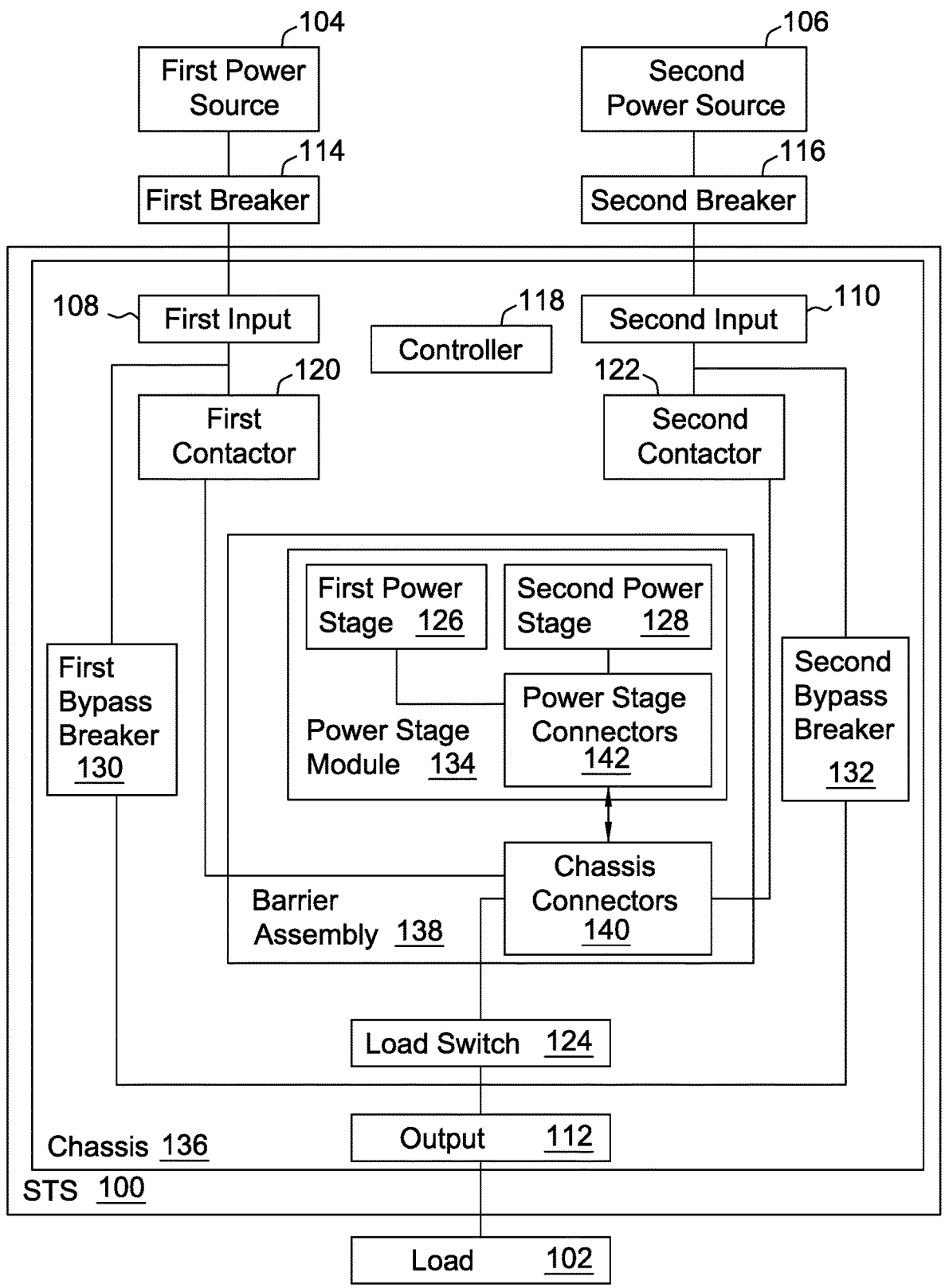
FIG. 1 depicts a block diagram of a static transfer switch in an exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

As used herein, the terms "processor" and "computer," and related terms, e.g., "processing device," "computing device," and "controller" are not limited to just those integrated circuits referred to in the art as a computer, but broadly refers to a microcontroller, a microcomputer, an analog computer, a programmable logic controller (PLC), an application specific integrated circuit (ASIC), and other programmable circuits, and these terms are used interchangeably herein. In the embodiments described herein, "memory" may include, but is not limited to, a computer-readable medium, such as a random-access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a touchscreen, a mouse, and a keyboard. Alternatively, other computer peripherals may also be used that may include, for example, but not be limited to, a scanner. Furthermore, in the example embodiment, additional output channels may include, but not be limited to, an operator interface monitor or heads-up display. Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an ASIC, a programmable logic controller (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are not intended to limit in any way the definition and/or meaning of the term processor and processing device.

As discussed previously, in order to implement bypass operations on a typical STS, complicated mechanical key interlocks may be needed in order to ensure that the load is not dual sourced at the same time by the bypass breakers. In addition, the additional mechanical key interlocks typically used on an STS for bypass operations may entail additional operator interaction and the potential for inadvertently disconnecting a critical load from a source. Further, in some cases it is desirable to service the power stages of the STS without undue disassembly of the STS. For example, it is desirable to enable the power stages to be removable from the STS. However, once removed from the STS, various high voltage connectors and components of the STS may be accessible to the user, which is undesirable.

In the embodiments described herein, STSs are disclosed that utilize hybrid bypass schemes that include both manual breakers and contactors operated by a controller. The use of hybrid bypass schemes eliminate or reduce prior operator error during bypassing and un-bypassing an STS. The hybrid bypass schemes enable simple interlocking between bypass switches, reduce the operator effort when transitioning the STS into and out of bypass, and reduce the mechanical complexity of STSs. Further, in the embodiments disclosed herein, the power stages are removable from the STS, which allows the power stages to be replaced while the STS is in a bypass operation. During removal of the power stages, a barrier assembly operates to cover the high voltage components and connectors that are exposed to the user, which improves the safety of the user performing the service on the STS.

FIG. 1 depicts a block diagram of an STS 100 in an exemplary embodiment. STS 100 will be described with respect to various discrete elements, which perform functions. These elements may be combined in different embodiments or segmented into different discrete elements in other embodiments.

In this embodiment, STS 100 selectively supplies a load 102 with electrical power from either a first power source 104 or a second power source 106 depending on various criteria. For example, STS 100 may supply electrical power to load 102 primarily from first power source 104 unless the electrical power delivered by first power source 104 falls outside of a desired range of values (e.g., first power source 104 has a voltage, frequency, and/or a harmonic distortion that varies from target values by a threshold amount). If, for example, first power source 104 is incapable of supplying electrical power to load 102 (e.g., first power source 104 fails or is incapable of supplying electrical power to load 102 at a desired power quality), then STS 100 switches load 102 from first power source 104 to second power source 106. In this regard, first power source 104 may operate as a preferred power source for load 102, with second power source 106 operating as a backup or alternate power source for load 102. Although only two power sources for load 102 are depicted in FIG. 1, STS 100 selectively couples load 102 to any number of power sources in other embodiments. Further, although STS 100 is depicted as switching single phase alternating current (AC) power in FIG. 1, STS 100 switches 3-phase AC power in other embodiments. In 3-phase AC embodiments, first power source 104 and second power source 106 are 3-phase AC sources, and load 102 is a 3-phase AC load. In other embodiments, first power source 104 and second power source 106 are direct current (DC) sources, and load 102 is a DC load. In other embodiments, first power source 104 and second power source 106 are 3-phase AC sources, and STS 100-1 supplies a plurality of single-phase AC loads (e.g., load 102 is a plurality of single-phase AC loads).

In this embodiment, first power source 104 is electrically coupled to STS 100 at a first input 108 and second power source 106 is electrically coupled to STS 100 at a second input 110. Load 102 is electrically coupled to an output 112 of STS 100. First input 108 is selectively coupled with first power source 104 via a first circuit breaker 114 and second input 110 is selectively coupled with second power source 106 via a second circuit breaker 116. First circuit breaker 114 and second circuit breaker 116 may comprise manual breakers (which open and close via operator interaction), electro-mechanically operated breakers (which open and close via external command signals from a first controller 118), and combinations thereof.

In this embodiment, STS 100 further includes a first contactor 120, a second contactor 122, a load switch 124, a first power stage 126, a second power stage 128, and first controller 118. First and second contactors 120, 122 comprise any component, system, or device that provides galvanic isolation between their respective first and second inputs 108, 110 and first and second power stages 126, 128 (e.g., first and second contactors 120, 122 may comprise an electro-mechanical device that provides galvanic isolation via an air gap when opened). First and second contactors 120, 122 may be opened and closed via commands or signals provided by first controller 118. Further, first and second contactors 120, 122 may not be externally accessible at STS 100 by an operator in some embodiments, and further still, first and second contactors 120, 122 may not provide overcurrent trip capabilities in some embodiments.

First and second power stages 126, 128 may comprise thyristors or other types of solid-state switches, which selectively couple first and second contactors 120, 122 with load switch 124, respectively. Load switch 124 may comprise any component, system, or device that provides galvanic isolation between first and second power stages 126, 128 and output 112 of STS 100 (e.g., load switch 124 may comprise an electro-mechanical device that provide galvanic isolation via an air gap when opened such as a breaker or a contactor). Load switch 124 may be opened and closed via commands or signals provided by first controller 118. In some embodiments, load switch 124 may comprise a breaker accessible to an operator at STS 100. Further, load switch 124 may provide overcurrent trip capabilities in some embodiments. In other embodiments, load switch 124 comprises one or more solid-state switching devices, such as thyristors.

In this embodiment, STS 100 further includes a first bypass breaker 130 and a second bypass breaker 132, which may be manually operated by an operator and/or electromechanically operated by first controller 118. In some embodiments, first bypass breaker 130 and/or second bypass breaker 132 comprise switches (e.g., molded case switches). In this embodiment, first and second bypass breakers 130, 132 include an interlock (mechanical, electrical, or combinations thereof) which prevents both first and second bypass breakers 130, 132 from being closed at the same time. In some embodiments, first controller 118 operates first and second bypass breakers 130, 132 to implement the interlock between first and second bypass breakers 130, 132. For example, first controller 118 prevents second bypass breaker 132 from being closed by an operator if first controller 118 detects that first bypass breaker 130 is already closed, and vice versa. In other embodiments, first controller 118 may implement electromagnetic locks at first and second bypass breakers 130, 132 in order to prevent first and second bypass breakers 130, 132 from being opened or closed at the wrong time as STS 100 transitions between a normal operating state and a bypassed operating state, and vice versa.

In this embodiment, first and second power stages 126, 128 are included as part of a first power stage module 134, which is removable from a chassis 136 of STS 100. In particular, first power stage module 134 is removably coupled to chassis 136 via a first barrier assembly 138. First barrier assembly 138 comprises any component, system, or device, which allows first power stage module 134 to be removably coupled with chassis 136. For example, first barrier assembly 138 may comprise a door assembly that automatically opens to expose first chassis connectors 140 on chassis 136 to first power stage connectors 142 on first power stage module 134 when first power stage module 134 is inserted into first barrier assembly 138. In continuing with the example, first barrier assembly 138 may comprise a door assembly that automatically closes to cover first chassis connectors 140 on chassis 136 when first power stage module 134 is removed from first barrier assembly 138.

In this embodiment, first power stage connectors 142 on first power stage module 134 provide the electrical connections between first and second power stages 126, 128 and other components of STS 100 while first power stage module 134 is inserted into first barrier assembly 138.

Figure 2:
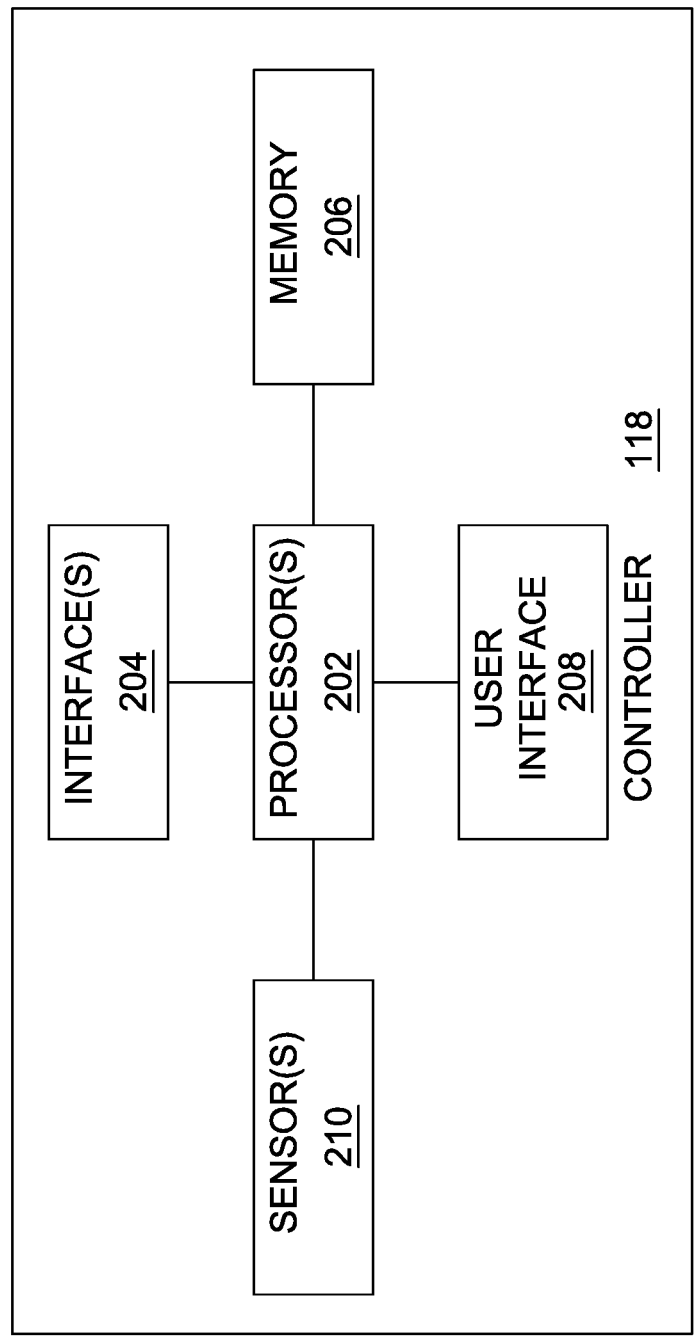
FIG. 2 depicts a block diagram of a controller of the static transfer switch of FIG. 1 in an exemplary embodiment.

FIG. 2 depicts a block diagram of first controller 118 in an exemplary embodiment. First controller 118 comprises any component, system, or device that performs the functionality described herein for first controller 118. First controller 118 will be described with respect to various discrete elements, which perform functions. These elements may be combined in different embodiments or segmented into different discrete elements in other embodiments. In this embodiment, first controller 118 comprises at least one processor 202, at least one interface 204, at least one memory 206, a user interface 208, and at least one sensor 210. In some embodiments, memory 206 stores programmable instructions that control the operation of processor 202 in order to implement the functionality described herein for first controller 118. In some embodiments, first controller 118 comprises a different configuration of components, and therefore, the discussion of first controller 118 is not limited to the specific configuration and arrangement depicted in FIG. 2.

Interface 204 may comprise wired interfaces, wireless interfaces, and combinations thereof. Interface 204 may be used by first controller 118 to communicate with the various components of STS 100, such as first and second circuit breakers 114, 116, first and second bypass breakers 130, 132, first and second contactors 120, 122, first and second power stages 126, 128, and load switch 124, in order to control their operation and/or in order to determine their open and closed states. User interface 208 may comprise keypads, display devices, trackball devices, mice, buttons, and the like, which enable an operator to interact with STS 100.

Sensors 210 comprise any voltage sensor, current sensor, frequency sensor, and combinations thereof. First controller 118 may use sensors 210 to determine the operating states (e.g., open or closed) of the various switching components of STS 100, such as first and second circuit breakers 114, 116, first and second bypass breakers 130, 132, first and second contactors 120, 122, first and second power stages 126, 128, and load switch 124. Sensors 210 may also be used to evaluate the operation and/or the power quality at first and second power sources 104, 106, measure various electrical parameters at first and second inputs 108, 110, output 112, detect faults at first and second power stages 126, 128, etc.

Figure 3:
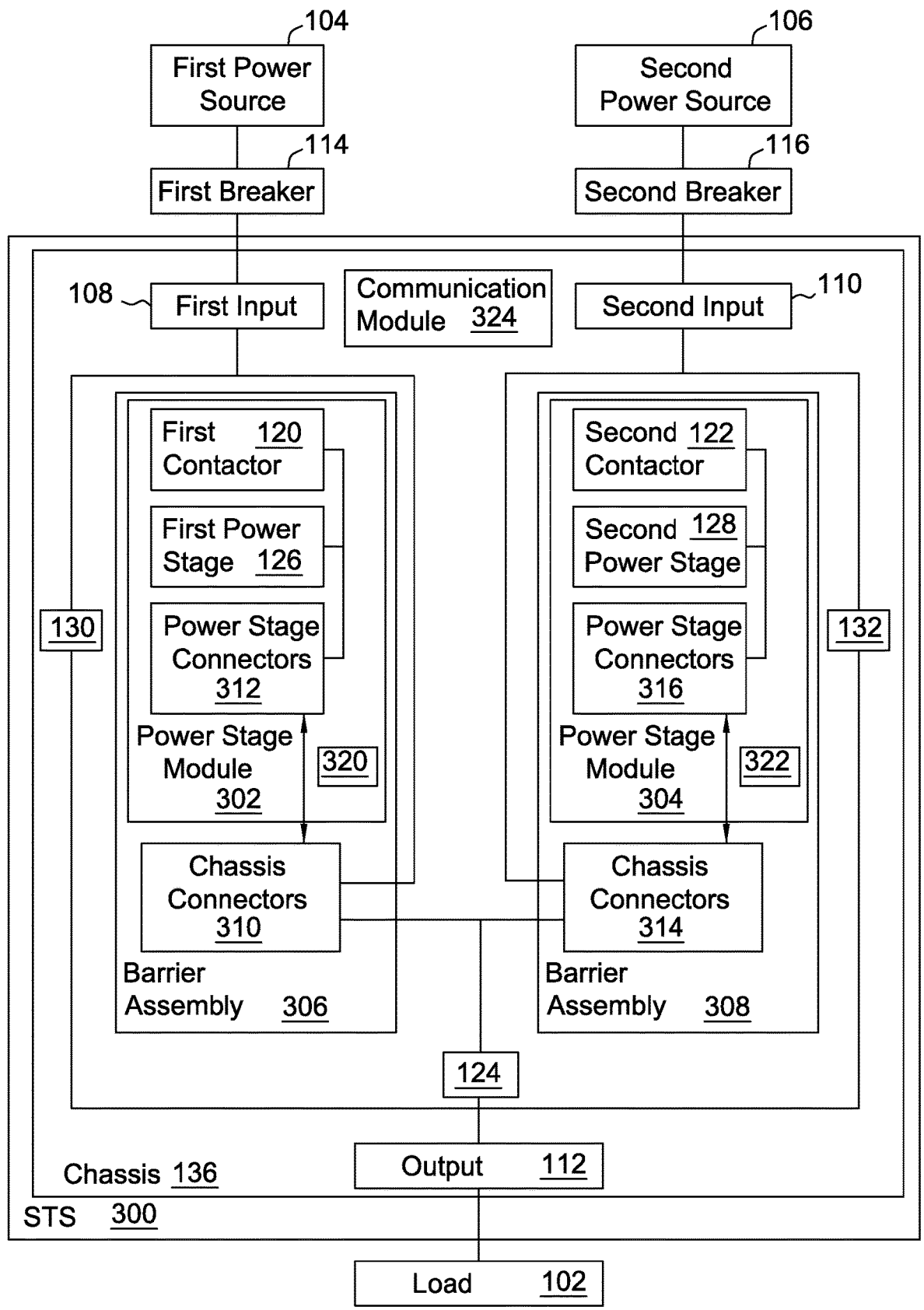
FIG. 3 depicts a block diagram of a static transfer switch in another exemplary embodiment.

FIG. 3 depicts a block diagram of an STS 300 in another exemplary embodiment. STS 300 will be described with respect to various discrete elements, which perform functions. These elements may be combined in different embodiments or segmented into different discrete elements in other embodiments.

In this embodiment, STS 300 selectively supplies a load 102 with electrical power from either a first power source 104 or a second power source 106 depending on various criteria, similar to previously described with respect to STS 100. The components of STS 300 that have the same or similar reference numbers as STS 100 may operate the same or similar to that previously described with respect to STS 100.

In this embodiment, first and second power stages 126, 128 and first and second contactors 120, 122 are included as part of second and third power stage modules 302, 304, respectively, which are removable from chassis 136 of STS 300. In particular, second power stage module 302 is removably coupled to chassis 136 via a second barrier assembly 306 and third power stage module 304 is removably coupled to chassis via a third barrier assembly 308. Second and third barrier assemblies 306, 308 comprise any component, system, or device, which allows second and third power stage modules 302, 304 to be removably coupled with chassis 136. For example, second barrier assembly 306 may comprise a door assembly that automatically opens to expose second chassis connectors 310 on chassis 136 to second power stage connectors 310 on second power stage module 302 when second power stage module 302 is inserted into second barrier assembly 306. In a similar manner, third barrier assembly 308 may comprise a door assembly that automatically opens to expose third chassis connectors 314 on chassis 136 to third power stage connectors 316 on third power stage module 304 when third power stage module 304 is inserted into third barrier assembly 308.

In this embodiment, second and third power stage connectors 312, 316, when coupled with second and third chassis connectors 310, 312, provide the electrical connections between first and second power stages 126, 128, first and second contactors 120, 122, and second and third controllers 320, 322 with other components of STS 300.

In this embodiment, second power stage module 302 includes second controller 320 and third power stage module 304 includes a third controller 322. Second and third controllers 320, 322 communicate with a communication module 324 of STS 300, and coordinate the operation of STS 300. In this embodiment, second controller 320 coordinates the operation of first contactor 120 and first power stage 126 of second power stage module 302, and third controller 322 coordinates the operation of second contactor 122 and second power stage 128 of third power stage module 128. Communication module 324 may coordinate the operation of first and second bypass breakers 130, 132, first and second breakers 114, 116, and load switch 124, under the direction of second and third controllers 320, 322.

Figure 4:
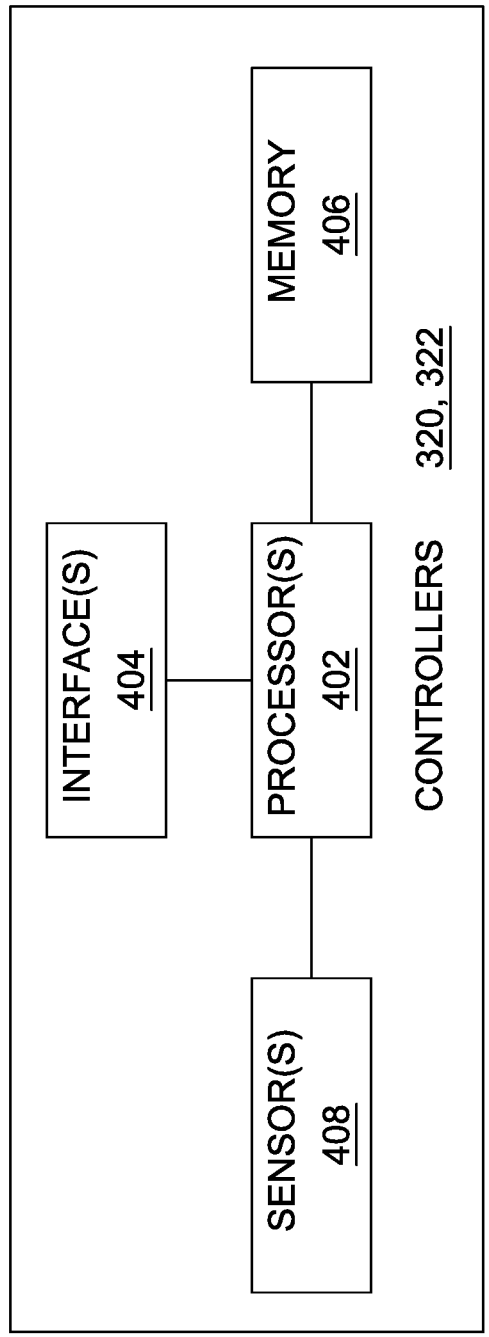
FIG. 4 depicts a block diagram of a controller of the static transfer switch of FIG. 3 in an exemplary embodiment.

FIG. 4 depicts a block diagram of second and third controllers 320, 322 in an exemplary embodiment. Second and third controllers 320, 322 comprises any component, system, or device that performs the functionality described herein for second and third controllers 320, 322. In this embodiment, second and third controllers 320, 322 comprises at least one processor 402, at least one interface 404, at least one memory 406, and at least one sensor 408. Processor 402, interface 404, memory 406, and sensors 408 may operate similarly to processor 202, interface 404, memory 406, and sensors 210 of FIG. 2.

Figure 5:
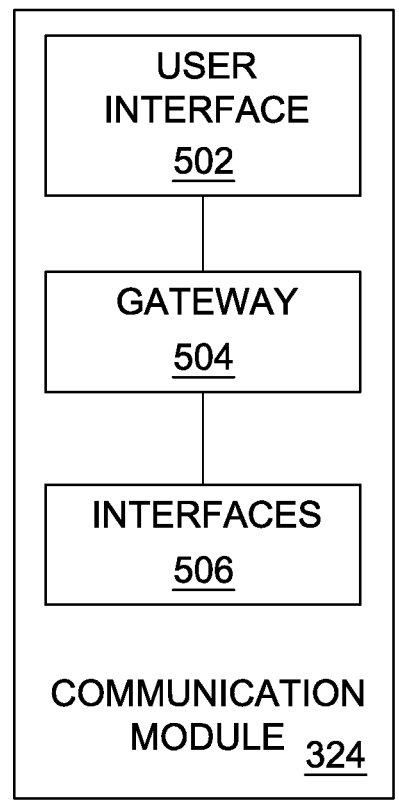
FIG. 5 depicts a block diagram of a communication module of the static transfer switch of FIG. 3 in an exemplary embodiment.

FIG. 5 depicts a block diagram of communication module 324 in an exemplary embodiment. Communication module 324 comprises any component, system, or device that performs the functionality described herein for communication module 324. Communication module 324 will be described with respect to various discrete elements, which perform functions. These elements may be combined in different embodiments or segmented into different discrete elements in other embodiments.

In this embodiment, communication module 324 includes a user interface 502, which may be similar to user interface 208 of FIG. 2 previously described. Communication module 324 in this embodiment further includes a gateway 504 and interfaces 506. Gateway 504 may be used to communicate with external devices over a network (not shown). For example, second and third controllers 320, 322 of second and third power stage modules 302, 304 may utilize gateway 504 to communicate, for example, to external devices over the Internet. Interfaces 506 of communication module 324 may operate similarly as interfaces 204 of FIG. 2, in order to read information from and/or operate first and second bypass breakers 130, 132, first and second bypass breakers 114, 116, and load switch 124.

Figure 6:
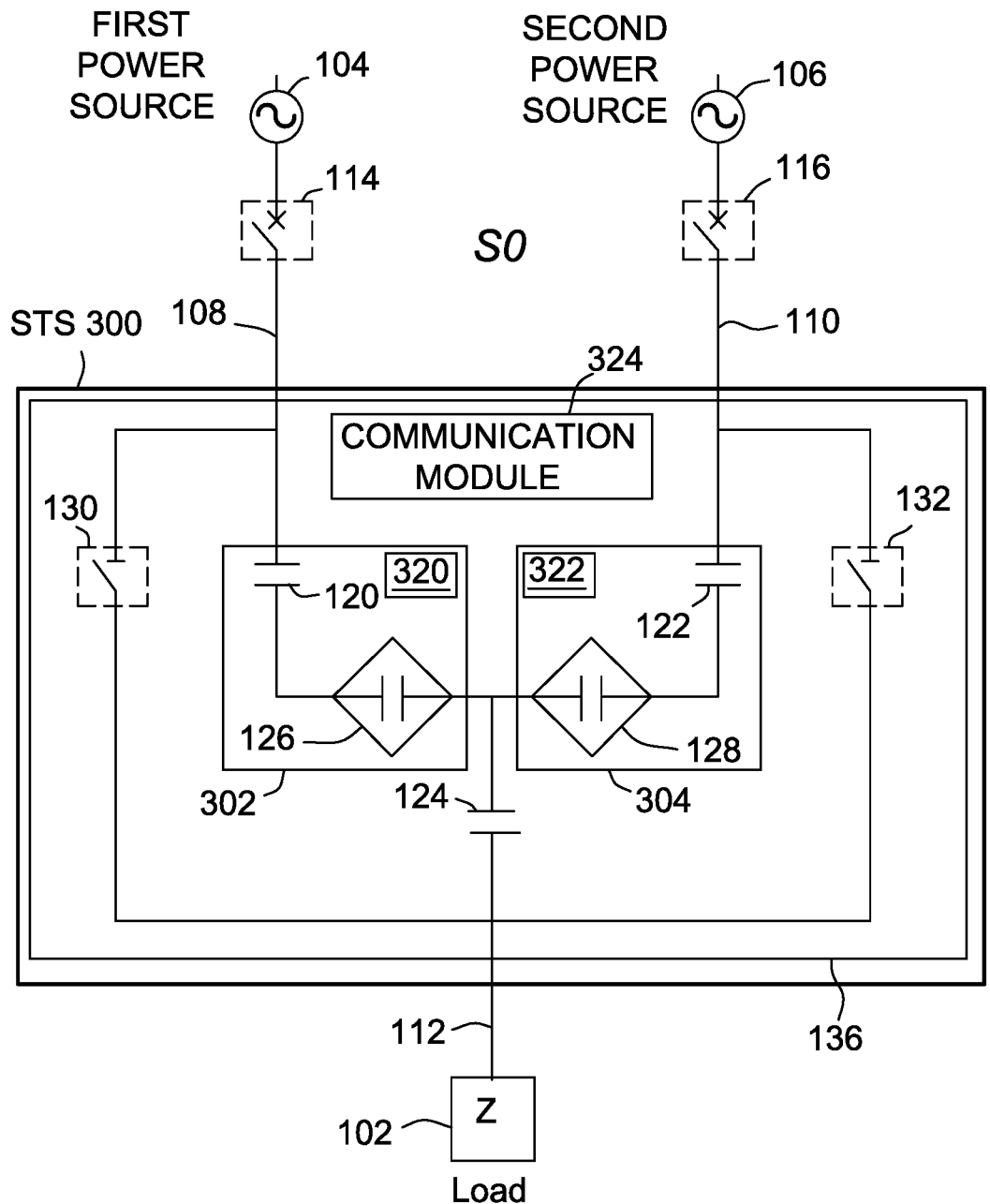
FIG. 6 depicts a simplified circuit diagram of the static transfer switch of FIG. 3 in an operating state S0 in an exemplary embodiment.

FIG. 6 depicts a simplified circuit diagram of STS 300 in an operating state S0 in an exemplary embodiment. The discussion of operating state S0 may apply equally to STS 100 (see FIG. 1). In operating state S0, first and second circuit breakers 114, 116, first and second contactors 120, 122, load switch 124, and first and second bypass breakers 130, 132 are open. Further, first and second power stages 126, 128 are deactivated or inactive. Operating state S0 may occur at startup of STS 100, 300, when first and second power sources 104, 106 are not powering load 102.

Figure 7:
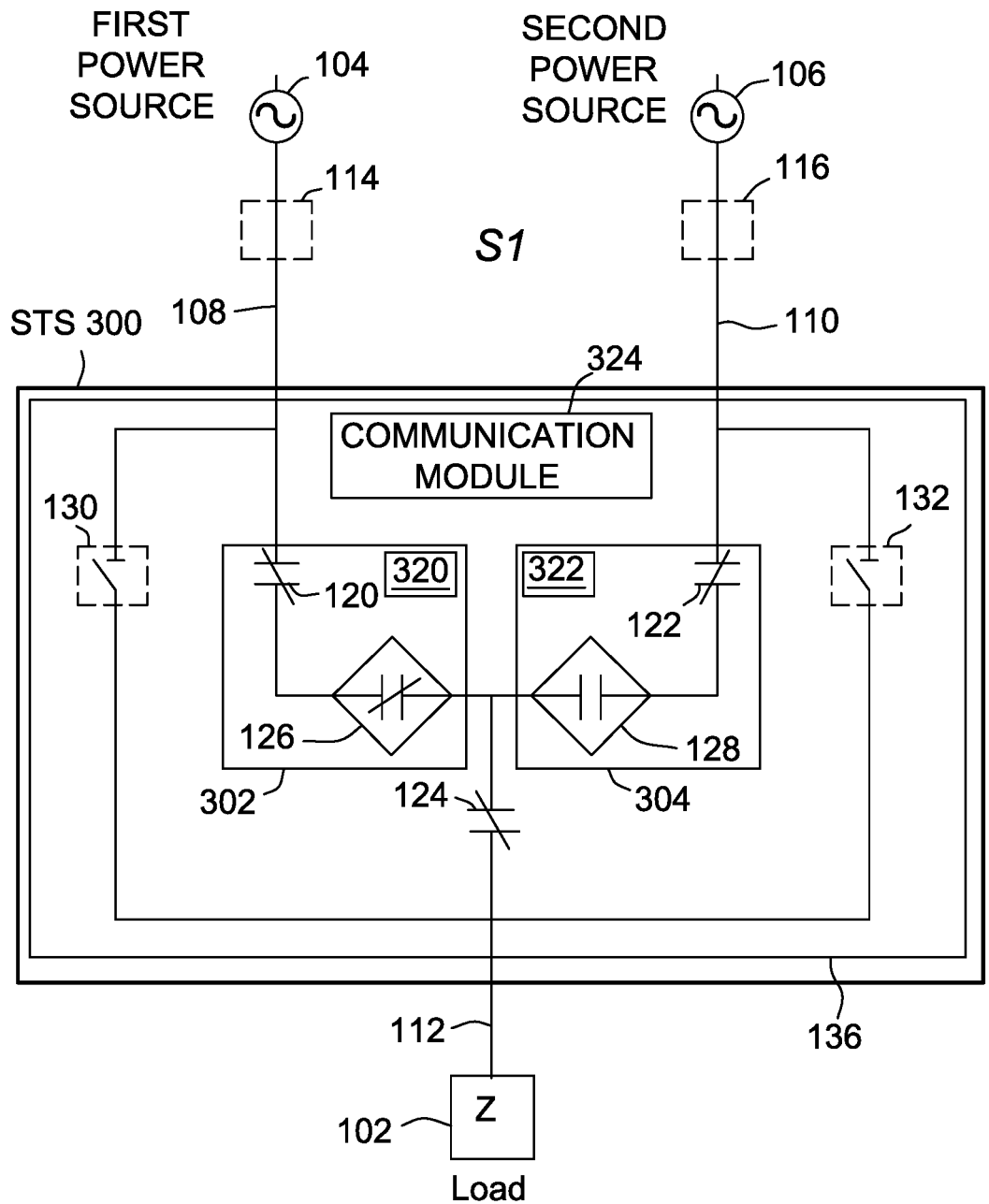
FIG. 7 depicts a simplified circuit diagram of the static transfer switch of FIG. 3 in an operating state S1 in an exemplary embodiment.

FIG. 7 depicts a simplified circuit diagram of STS 300 in an operating state S1 in an exemplary embodiment. The discussion of operating state S1 may apply equally to STS 100 (see FIG. 1). In operating state S1, first power source 104 is the power source for load 102 and second power source 106 is the backup or alternate power source for load 102. First and second circuit breakers 114, 116 are closed, first and second contactors 120, 122 are closed, and load switch 124 is closed. First power stage 126 is active (e.g., first power stage 126 conducts current) and second power stage 128 is inactive (e.g., second power stage 128 does not conduct current). First and second bypass breakers 130, 132 are open. Operating state S1 may be considered a normal operating state for STS 100, 300 when first power source 104 is powering load 102 via first contactor 120, first power stage 126, and load switch 124.

Figure 9:
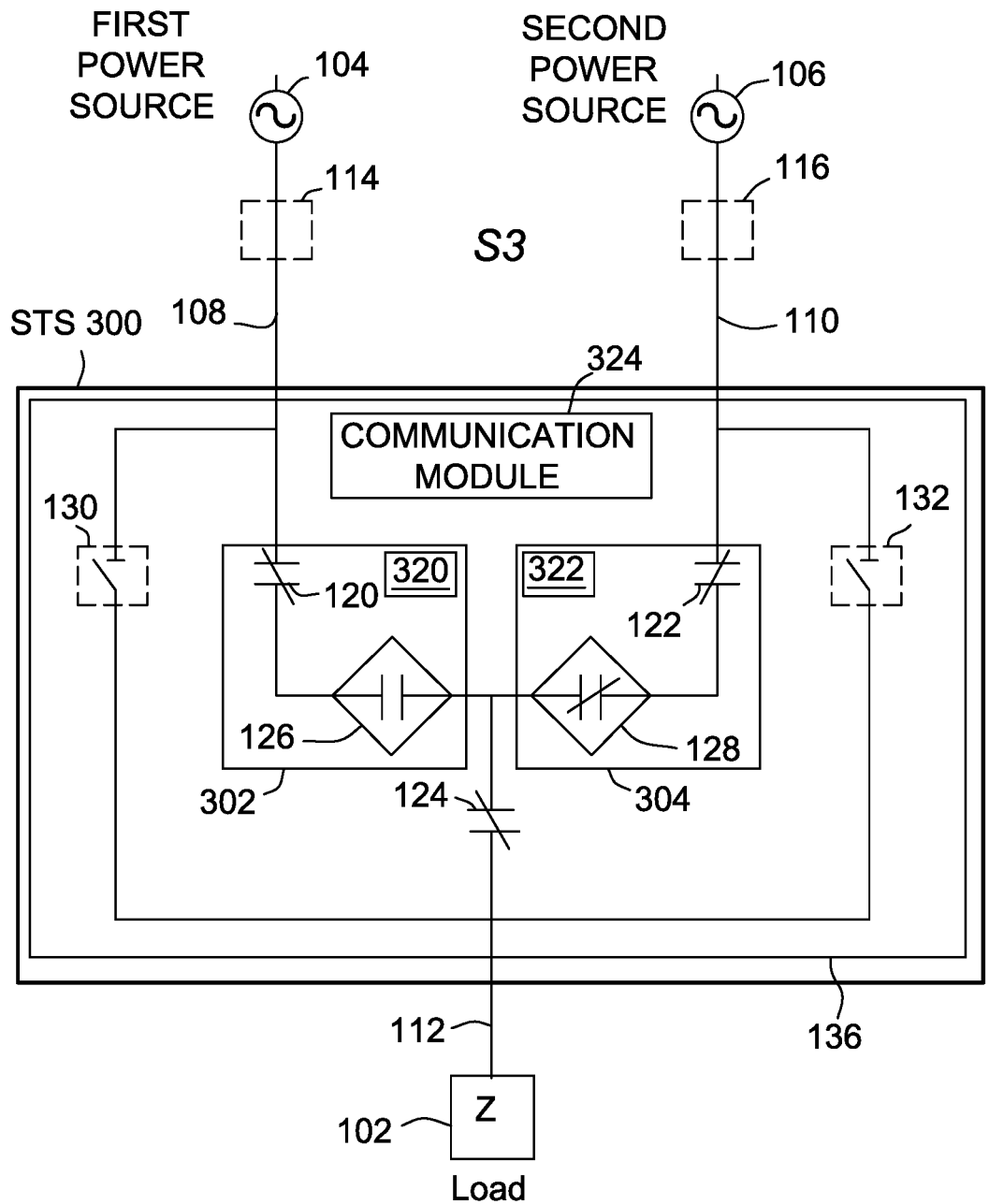
FIG. 9 depicts a simplified circuit diagram of the static transfer switch of FIG. 3 in an operating state S3 in an exemplary embodiment.

In operating state S1, if controllers 118, 320, 322 determine that first power source 104 is not capable of supplying electrical power to load 102 (e.g., due to power loss at first power source 104 or a power quality issue at first power source 104), then controllers 118, 320, 322 operate to quickly transfer load 102 from first power source 104 to second power source 106 by activating second power stage 128 and deactivating first power stage 126 (e.g., using a load transfer process). The result of this load transfer process is depicted in FIG. 9, which illustrates an operating state S3 of STS 300 when second power source 106 is powering load 102 and first power source 104 is the backup power source for load 102. The discussion of operating state S3 may apply equally to STS 100 (see FIG. 1). In operating state S3, first power stage 126 is inactive, and second power stage 128 is active. Operating state S3 may be considered a normal operating state for STS 100, 300 when second power source 106 is powering load 102 via second contactor 122, second power stage 126, and load switch 124.

Figure 8:
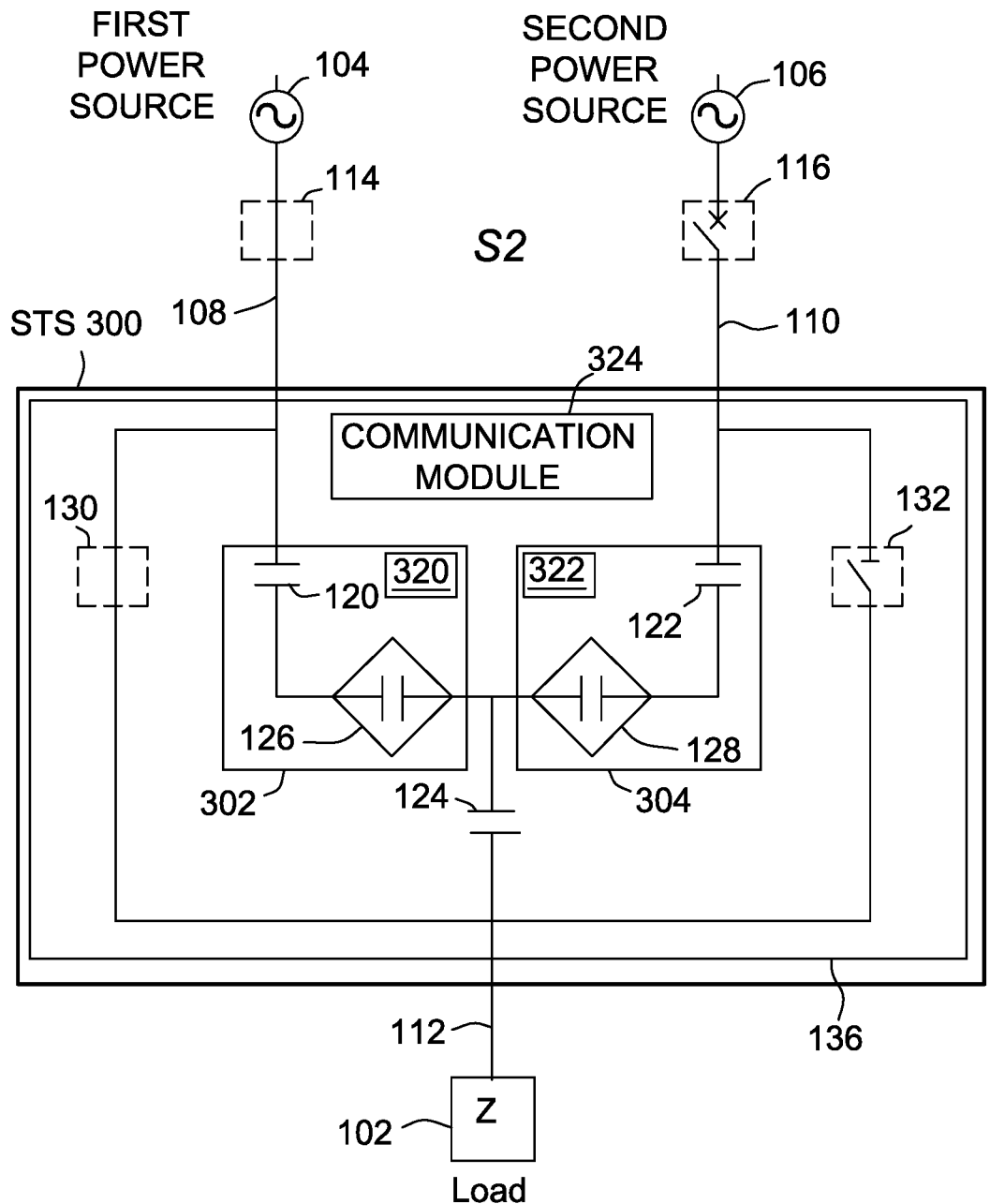
FIG. 8 depicts a simplified circuit diagram of the static transfer switch of FIG. 3 in an operating state S2 in an exemplary embodiment.

FIG. 8 depicts a simplified circuit diagram of STS 300 at an operating state S2 in an exemplary embodiment. The discussion of operating state S2 may apply equally to STS 100 (see FIG. 1). In operating state S2, STS 300 is in bypass while first power source 104 continues to power load 102. In operating state S2, first power source 104 is the power source for load 102 and second power source 106 is disconnected from second input 110 of STS 100. First circuit breaker 114 is closed and second circuit breaker 116 open. First and second contactors 120, 122 are open, and load switch 124 is open. First and second power stages 126, 128 are inactive (e.g., first and second power stages 128 do not conduct current). First bypass breaker 130 is closed and second bypass breaker 132 is open. Operating state S2 may be considered as a bypass state for STS 100, 300 when first power source 104 is powering load 102 via first bypass breaker 130.

Figure 10:
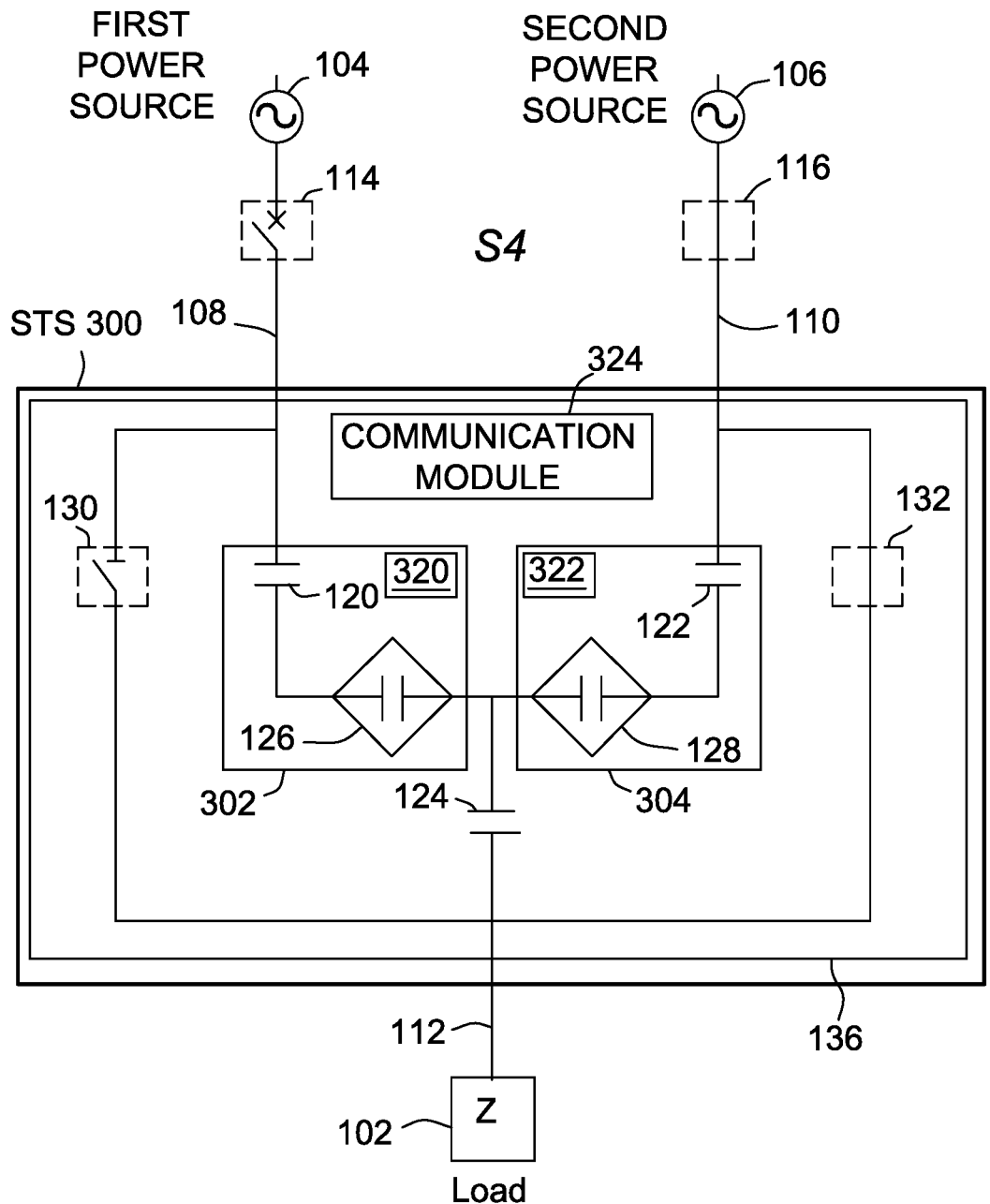
FIG. 10 depicts a simplified circuit diagram of the static transfer switch of FIG. 3 in an operating state S4 in an exemplary embodiment.
Figure 11:
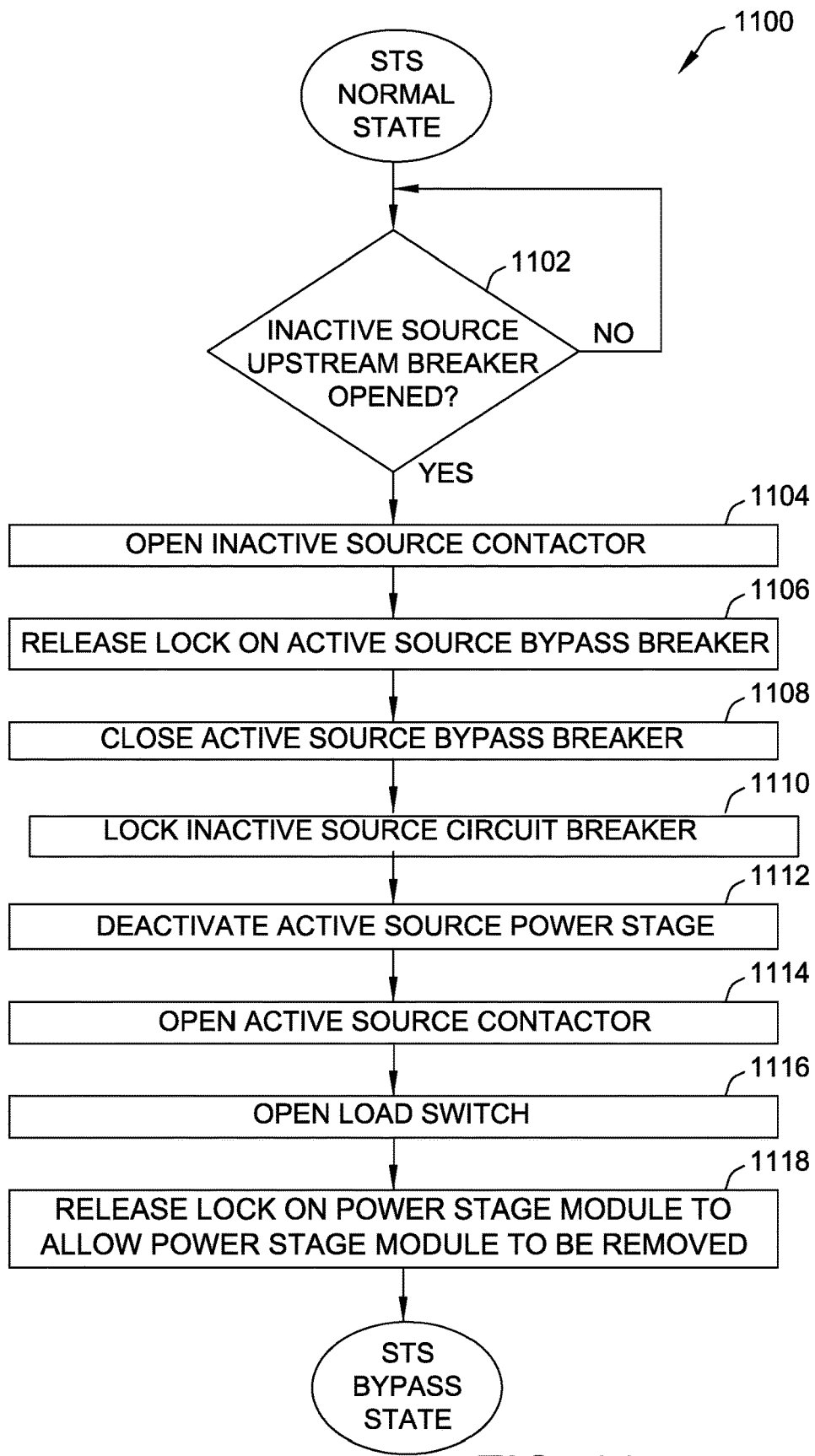
FIG. 11 depicts a flow chart of a method for transitioning a static transfer switch from a normal state to a bypassed state in an exemplary embodiment.

FIG. 11 depicts a flow chart of a method 1100 of transitioning a static transfer switch from a normal operating state to a bypassed operating state in an exemplary embodiment. Method 1100 will be discussed with respect to STS 100, 300 of FIGS. 1-10, although method 1100 may apply to other configurations of static transfer switches, not shown.

When transitioning from operating state S1 to S2 (e.g., when transitioning STS 100, 300 from a normal operating state to a bypassed operating state), method 1100 comprises determining 1102 whether the inactive source circuit breaker has opened, opening 1104 the inactive source contactor, and releasing 1106 the lock on the active source bypass breaker. For example, controllers 118, 320, 322 determine that second circuit breaker 116 is opened (e.g., by an operator), controllers 118, 320, 322 open second contactor 122 and release a lock on first bypass breaker 130.

Method 1100 further comprises closing 1108 the active source bypass breaker, locking 1110 the inactive source circuit breaker, and deactivating 1112 the active source power stage. For example, controllers 118, 320, 322 or an operator closes first bypass breaker 130, controllers 118, 320, 322 lock second circuit breaker 116 open and deactivate first power stage 126.

Method 1100 further comprises opening 1114 the active source contactor, opening 1116 the load switch, and releasing 1118 a lock on the power stage module(s) to allow the power stage module(s) to be removed. For example, first controller 118 opens first contactor 120 and load switch 124, and releases a lock on first power stage module 134 that secured first power stage module 134 within first barrier assembly 138. Regarding STS 300, second and/or third controllers 320, 322 open first contactor 120 and load switch 124 (e.g., via communication module 324), and release a lock on second and/or third power stage modules 302, 304.

The result of method 1100 is that STS 100, 300 is now in a bypassed state with first power source 104 powering load 102 via first bypass breaker 130. A user may then remove first power stage module 134 from first barrier assembly 138 (see FIG. 1), and first barrier assembly 138 operates to cover first chassis connectors 140 from being exposed to the user. For example, a door assembly closes over first chassis connectors 140 when first power stage module 134 is removed from first barrier assembly 138. Regarding STS 300, a user may remove second and/or third power stage modules 302, 304 from second and/or third barrier assemblies 306, 308 (see FIG. 3), and second and/or third barrier assemblies 306, 308 operate to cover second and/or third chassis connectors 310, 314 from being exposed to the user. For example, door assemblies close over second and/or third chassis connectors 310, 314 when second and/or third power stage modules 302, 304 are removed from second and/or third barrier assemblies 306, 308.

In some embodiments, controllers 118, 320, 322 may transition STS 100, 300 from operating state S1 to S2 automatically in response to a command from an operator. For example, an operator may utilize user interface 502 to direct second and/or third controllers 320, 322 (or first controller 118 of FIG. 1 using user interface 208) to sequence the various operations described when transitioning from operating state S1 to S2 in response to the operator selecting a bypass operation at STS 100, 300 when first power source 104 is powering load 102 (e.g., the operator may utilize user interface 208 to select a bypass operation at STS 100 and user interface 502 to select a bypass operation at STS 300).

Figure 12A:
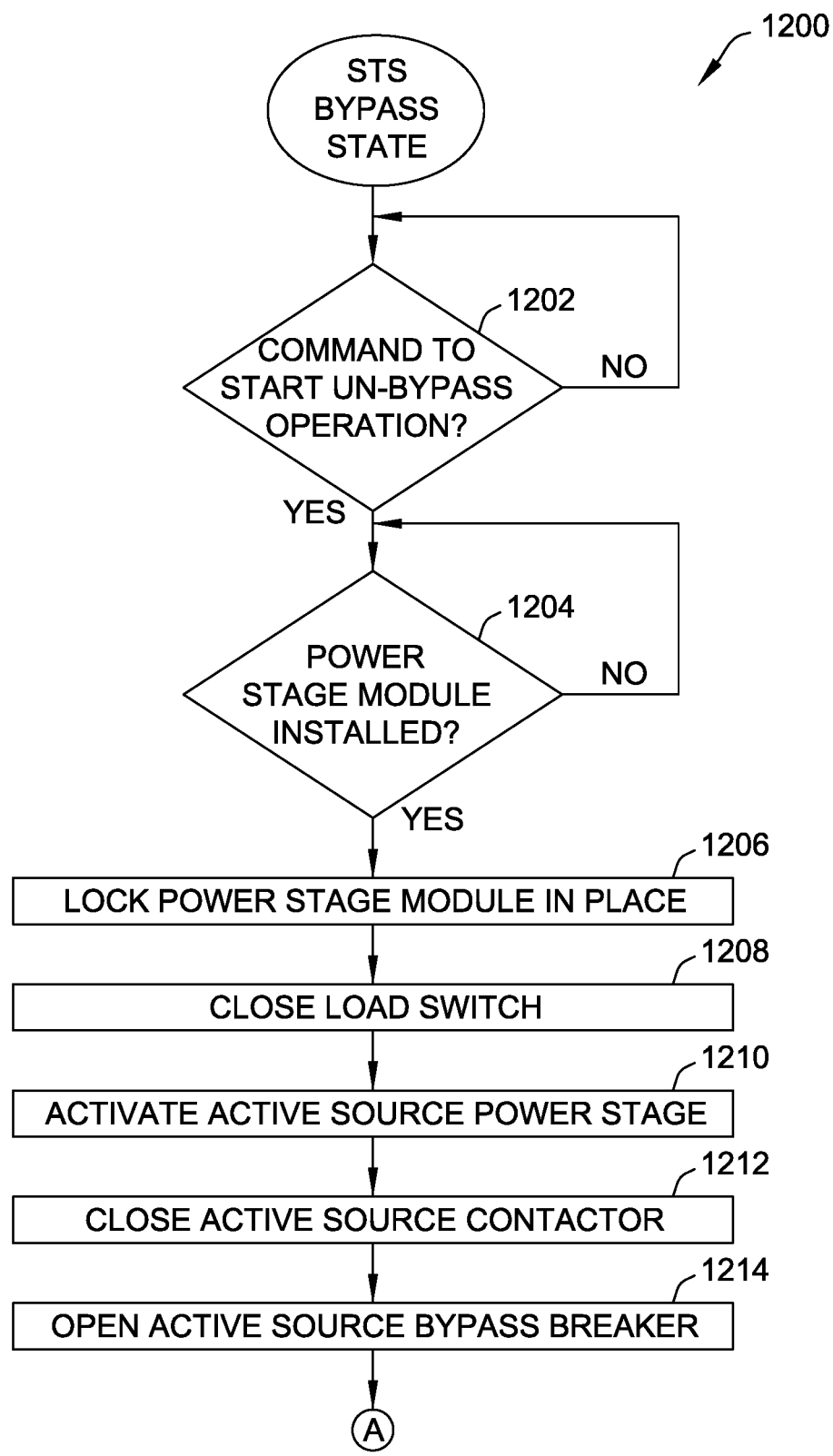
FIGS. 12A and 12B depict a flow chart of a method for transitioning a static transfer switch from a bypassed state to a normal state in an exemplary embodiment.
Figure 12B:
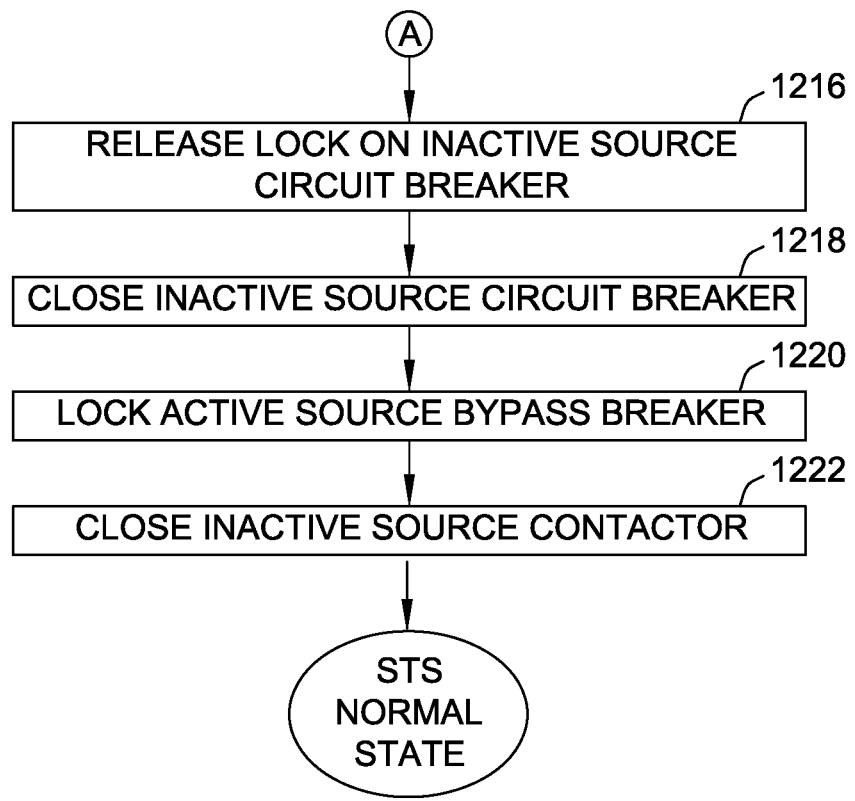

FIGS. 12A and 12B depict a flow chart of a method 1200 of transitioning a static transfer switch from a bypassed operating state to a normal operating state in an exemplary embodiment. Method 1200 will be discussed with respect to STS 100, 300 of FIGS. 1-10, although method 1200 may apply to other configurations of static transfer switches, not shown.

When transitioning from operating state S2 to S1 (e.g., when transitioning STS 100, 300 from a bypassed operating state to a normal operating state), method 1200 comprises determining 1202 whether a command has been received to start an un-bypass operation at STS 100, 300, and determining 1204 whether the power stage module(s) are installed in STS 100, 300. For example, first controller 118 determines whether an un-bypass command has been received (e.g., from an operator via user interface 208), and determines whether first power stage module 134 is installed in first barrier assembly 138 before method 1200 continues (see FIG. 1). Regarding STS 300, second and/or third controllers 320, 322 determine whether an un-bypass command has been received (e.g., from an operator via user interface 502), and determine whether second and third power stage modules 302, 304 are installed in second and third barrier assemblies 306, 308 before method 1200 continues In response to determining that the un-bypassed command has been received and that the power stage module(s) are installed, method 1200 further comprises locking 1206 the power stage module(s) in place (e.g., which prevents the power stage module(s) from being removed from STS 100, 300), closing 1208 the load switch, and activating 1210 the active source power stage. For example, first controller 118 (see FIG. 1) locks first power stage module 134 in place within first barrier assembly 138, closes load switch 124 and activates first power stage 126. Regarding STS 300 (see FIG. 3), second and/or third controllers 320, 322 lock second and third power stage modules 302, 304 within first and second barrier assemblies 306, 308, close load switch 124 (e.g., via communication module 324), and activate first power stage 126.

Method 1200 further comprises closing 1212 the active source contactor, opening 1214 the active source bypass breaker, and releasing 1216 the lock on the inactive source circuit breaker. For example, controllers 118, 320, 322 close first contactor 120, controllers 118, 320, 322 or the operator opens first bypass breaker 130, and controllers 118, 320, 322 release the lock on second circuit breaker 116.

Method 1200 further comprises closing 1218 the inactive source circuit breaker, locking 1220 the active source bypass breaker, and closing 1222 the inactive source contactor. For example, controllers 118, 320, 322 or the operator closes second circuit breaker 116, controllers 118, 320, 322 lock first bypass breaker 130 open and closes second contactor 122. The result of method 1200 is that STS 100, 300 is now in a normal or un-bypassed state with first power source 104 powering load 102 via first contactor 120, first power stage 126, and load switch 124.

In some embodiments, controllers 118, 320, 322 may transition STS 100, 300 from operating state S2 to S1 automatically in response to a command from an operator. For example, an operator may utilize user interface 208, 502 to direct controllers 118, 320, 322 to sequence the various operations described when transitioning from S2 to S1 in response to the operator selecting an STS un-bypass operation when first power source 104 is powering load 102 and first power stage module 134 is installed in first barrier assembly 138 (or second and third power stage modules 302, 304 are installed in second and third barrier assemblies 306, 308). In some embodiments, controllers 118, 320, 322 may prevent STS 100, 300 from transitioning from operating state S2 to S1 when controllers 118, 320, 322 detect certain conditions. For example, if controllers 118, 320, 322 detect that the power quality of first power source 104 is not acceptable (e.g., the voltage, frequency, and/or harmonic distortion at first power source 104 is outside of a predetermined range), then controllers 118, 320, 322 may not close first contactor 120 in order to prevent damage to first power stage 126 and/or load switch 124 (when load switch 124 comprises solid-state switching devices). Further, controllers 118, 320, 322 may operate to prevent first bypass breaker 130 from being opened as long as the power quality of first power source 104 is unacceptable. In another example, if first controller 118 detects that first power stage module 134 is not installed in first barrier assembly 138, then first controller 118 may not allow the un-bypass operation to continue, which prevents load 102 from being accidentally unpowered if STS 100 is taken out of bypass when first power stage module 134 is not installed. In another example, if second and/or third controllers 320, 322 detect that second and/or third power stage modules 302, 304 are not installed in second and/or third barrier assemblies 306, 308, then second and/or third controllers 320, 322 may not allow the un-bypass operation to continue, which prevents load 102 from being accidentally unpowered if STS 300 is taken out of bypass when second and third power stage modules 302, 304 are not installed. In another example, controllers 118, 320, 322 may prevent STS 100, 300 from transitioning from operating state S2 to S1 when a fault is detected at power stage modules 134, 302, 304 that prevent them from operating correctly.

As discussed briefly above, FIG. 9 depicts a simplified circuit diagram of STS 300 in the operating state S3 in an exemplary embodiment. In the operating state S3, second power source 106 is the power source for load 102 and first power source 104 is the backup or alternate power source for load 102. In operating state S3, first and second circuit breakers 114, 116, first and second contactors 120, 122, and load switch 124 are closed. First and second bypass breakers 130, 132 are open, first power stage 126 is inactive, and second power stage 128 is active.

FIG. 10 depicts a simplified circuit diagram of STS 300 in an operating state S4 in an exemplary embodiment. The discussion of operating state S4 may apply equally to STS 100 (see FIG. 1). In operating state S4, STS 300 is bypassed while second power source 106 continues to power load 102. In operating state S4, first circuit breaker 114 is open, second circuit breaker 116 is closed, first and second contactors 120, 122 are open, load switch 124 is open, first and second power stages 126, 128 are inactive, first bypass breaker 130 is open, and second bypass breaker 132 is closed.

When transitioning from operating state S3 to S4 (e.g., when transitioning STS 100, 300 from a normal state to a bypass state), method 1100 (see FIG. 11) comprises determining 1102 whether the inactive source circuit breaker has opened, opening 1104 the inactive source contactor, and releasing 1106 the lock on the active source bypass breaker. For example, controllers 118, 320, 322 determine that first circuit breaker 114 is opened (e.g., by an operator), and controllers 118, 320, 322 opens first contactor 120 and releases a lock on second bypass breaker 132.

Method 1100 further comprises closing 1108 the active source bypass breaker, locking 1110 the inactive source circuit breaker, and deactivating 1112 the active source power stage. For example, controllers 118, 320, 322 determine or an operator closes second bypass breaker 132, controllers 118, 320, 322 lock first circuit breaker 114 open and deactivates second power stage 128.

Method 1100 further comprises opening 1114 the active source contactor, opening 1116 the load switch, and releasing 1118 the lock on the power stage module(s) to allow the power stage module(s) to be removed from STS 100, 300. For example, first controller 118 opens second contactor 122 and load switch 124, and first controller 118 releases the lock on first power stage module 134. In another example, second and/or third controllers 320, 322 open second contactor 122 and load switch 124 (e.g., via communication module 324), and release the lock on second and/or third power stage modules 302, 304.

The result of method 1200 is that STS 100, 300 is now in a bypassed state with second power source 106 supplying electrical power to load 102 via second bypass breaker 132. A user may then remove first power stage module 134 from first barrier assembly 138, which operates to cover first chassis connectors 140 from being exposed to the user. For example, a door assembly closes over first chassis connectors 140 when first power stage module 134 is removed from first barrier assembly 138. Regarding STS 300 (see FIG. 3), user may then remove second and/or third power stage modules 302, 304 from second and/or third barrier assemblies 306, 308, which operate to cover second and/or third chassis connectors 310, 314 from being exposed to the user. For example, door assemblies close over second and/or third chassis connectors 310, 314 when second and/or third power stage modules 302, 304 are removed from second and/or third barrier assemblies 306, 308.

In some embodiments, controllers 118, 320, 322 may transition STS 100, 300 from operating state S3 to S4 automatically in response to a command from an operator. For example, an operator may utilize user interface 208, 502 to direct controllers 118, 320, 322 to sequence the various operations described when transitioning from operating state S3 to S4 in response to the operator selecting a bypass operation at STS 100, 300 when second power source 106 is powering load 102 (e.g., the operator may utilize user interface 208 to select a bypass operation at STS 100 and user interface 502 to select a bypass operation at STS 300).

When transitioning from operating state S4 to S3 (e.g., when transitioning STS 100, 300 from a bypassed state to a normal state), method 1200 (see FIGS. 12A and 12B) comprises determining 1202 whether a command has been received to start an un-bypass operation at STS 100, 300 and determining 1204 whether the power stage module(s) are installed. For example, first controller 118 determines whether an un-bypass command has been received (e.g., from an operator via user interface 208), and determine whether first power stage module 134 is installed in first barrier assembly 138 before method 1200 continues. In another example, second and/or third controllers 320, 322 determine whether an un-bypass command has been received (e.g., from an operator via user interface 502), and determine whether second and third power stage modules 302, 304 are installed in first and second barrier assemblies 306, 308 before method 1200 continues.

In response to determining that the un-bypassed command has been received and that the power stage module(s) are installed, method 1200 further comprises locking 1206 the power stage module(s) in place, closing 1208 the load switch, and activating 1210 the active source power stage. For example, first controller 118 (see FIG. 1) locks first power stage module 134 in place, closes load switch 124, and activates second power stage 128. In another example, second and/or third controllers 320, 322 (see FIG. 3) lock second and third power stage modules 302, 304 in place, close load switch 124 (e.g., via communication module), and activate second power stage 128.

Method 1200 further comprises closing 1212 the active source contactor, opening 1214 the active source bypass breaker, and releasing 1216 the lock on the inactive source circuit breaker. For example, controllers 118, 320, 322 close second contactor 122, controllers 118, 320, 322 or the operator opens second bypass breaker 132, and controllers 118, 320, 322 release the lock on first circuit breaker 114.

Method 1200 further comprises closing 1218 the inactive source circuit breaker, locking 1220 the active source bypass breaker, and closing 1222 the inactive source contactor. For example, controllers 118, 320, 322 or the operator closes first circuit breaker 114, controllers 118, 320, 322 lock second bypass breaker 132 open, and controllers 118, 320, 322 close first contactor 120. The result of method 1200 is that STS 100, 300 is now in a normal or un-bypassed state with second power source 106 powering load 102 via second contactor 122, second power stage 128, and load switch 124.

In some embodiments, controllers 118, 320, 322 may transition STS 100, 300 from operating state S4 to S3 automatically in response to a command from an operator. For example, an operator may utilize user interface 208, 502 to direct controllers 118, 320, 322 to sequence the various operations described when transitioning from S4 to S3 in response to the operator selecting an STS un-bypass operation when second power source 106 is powering load 102. In some embodiments, controllers 118, 320, 322 may prevent STS 100 from transitioning from operating state S4 to S3 when certain conditions are detected. For example, if controllers 118, 320, 322 detect that the power quality of second power source 106 is not acceptable (e.g., the voltage, frequency and/or harmonic distortion at second power source 106 is outside of a pre-determined range), then controllers 118, 320, 322 may not close second contactor 122 in order to prevent damage to second power stage 128 and/or load switch 124 (when load switch 124 comprises solid-state switching devices). Further, controllers 118, 320, 322 may operate to prevent second bypass breaker 132 from being opened as long as the power quality of second power source 106 is unacceptable. In another example, if first controller 118 detects that first power stage module 134 is not installed in first barrier assembly 138, then first controller 118 may not allow the un-bypass operation to continue, which prevents load 102 from being accidentally unpowered if STS 100 is taken out of bypass when first power stage module 134 is not installed. In another example, if second and/or third controllers 320, 322 detect that second and third power stage modules 302, 304 are not installed in second and third barrier assemblies 306, 308, then second and/or third controllers 320, 322 may not allow the un-bypass operation to continue, which prevents load 102 from being accidentally unpowered if STS 300 is taken out of bypass when second and third power stage modules 302, 304 are not installed.

An example technical effect of the apparatus and method described herein includes one or more of: (a) minimizing disruptions to a load buy preventing inadvertent operator error during bypass and un-bypass operations at an STS; (b) eliminate complicated electrical/trapped key interlocking schemes that add additional complexity to an STS; (c) reduce the amount of front panel on an STS that is dedicated to operator actuated breakers and switches used to operate the STS; and (d) enabling the removal of the power stages or power stages and contactors during bypass to improve the serviceability of the STS.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A static transfer switch comprising:
a chassis;
first and second inputs configured to selectively couple with first and second power sources via first and second circuit breakers, respectively;
an output configured to couple with a load;
first and second bypass breakers configured to selectively couple the first and second inputs, respectively, with the output;
a plurality of chassis connectors;
at least one removable power stage module comprising first and second power stages configured to conduct electrical power when active, and a plurality of power stage connectors configured to removably couple with the plurality of chassis connectors;
at least one automatic barrier assembly sized to accept the at least one removable power stage module, the at least one automatic barrier assembly configured to actuate and cover the plurality of chassis connectors in response to the at least one removable power stage module being removed from the at least one automatic barrier assembly, and to actuate and uncover the plurality of chassis connectors in response to the at least one removable power stage module being installed in the at least one automatic barrier assembly;
first and second contactors, the first contactor configured to selectively couple the first input with the first power stage, and the second contactor configured to selectively couple the second input with the second power stage;
a load switch configured to selectively couple the first and second power stages with the output via the at least one of the plurality of chassis connectors; and
at least one controller configured to modify an operating state of the first and second contactors and the first and second power stages.

2. The static transfer switch of claim 1, wherein:
the first and second circuit breakers are closed, the first and second bypass breakers are open, the first power stage is active, the second power stage is inactive, the first and second contactors are closed, and the load switch is closed, and
the at least one controller is further configured to determine whether the second circuit breaker has opened; and
in response to determining that the second circuit breaker has opened, the at least one controller is further configured to:
open the second contactor; and
release a lock on the first bypass breaker.

3. The static transfer switch of claim 2, wherein the at least one controller is further configured to:
cause the first bypass breaker to close; and
lock the second circuit breaker in an open position.

4. The static transfer switch of claim 3, wherein the at least one controller is further configured to:
deactivate the first power stage;
open the first contactor;
cause the load switch to open; and
release a lock on the at least one removable power stage module to allow the at least one removable power stage module to be withdrawn from the at least one automatic barrier assembly.

5. The static transfer switch of claim 1, wherein:
the first circuit breaker is closed, the second circuit breaker is open, the first bypass breaker is closed, the second bypass breaker is open, the first and second power stages are inactive, the first and second contactors are open, and the load switch is open, and
the at least one controller is further configured to:
receive a command to perform an un-bypass operation for the static transfer switch;
determine whether the at least one removable power stage module is installed in the at least one automatic barrier assembly; and
cause the load switch to close and lock the at least one removable power stage module in place in response to (i) receiving the command to perform the un-bypass operation for the static transfer switch and (ii) determining that the at least one removable power stage module is installed.

6. The static transfer switch of claim 5, wherein the at least one controller is further configured to:
activate the first power stage; and
close the first contactor.

7. The static transfer switch of claim 6, wherein the at least one controller is further configured to:
cause the first bypass breaker to open; and
release a lock on the second circuit breaker.

8. The static transfer switch of claim 7, wherein the at least one controller is further configured to:
cause the second circuit breaker to close;
lock the first bypass breaker open; and
close the second contactor.

9. The static transfer switch of claim 5, wherein the at least one controller is further configured to:
block the un-bypass operation from being performed in response to determining that (i) a power quality of the first power source is outside of a pre-defined range or (ii) a fault condition exists at the first power stage and/or the second power stage.

10. The static transfer switch of claim 1, wherein:
the first and second circuit breakers are closed, the first and second bypass breakers are open, the first power stage is inactive, the second power stage is active, the first and second contactors are closed, and the load switch is closed, and
the at least one controller is further configured to determine whether the first circuit breaker has opened; and
in response to determining that the first circuit breaker has opened, the at least one controller is further configured to:
open the first contactor; and
release a lock on the second bypass breaker.

11. The static transfer switch of claim 10, wherein the at least one controller is further configured to:
cause the second bypass breaker to close; and
lock the first circuit breaker in an open position.

12. The static transfer switch of claim 11, wherein the at least one controller is further configured to:
deactivate the second power stage;
open the second contactor; and
cause the load switch to open; and
release a lock on the at least one removable power stage module to allow the at least one removable power stage module to be withdrawn from the at least one automatic barrier assembly.

13. The static transfer switch of claim 10, wherein:
the first circuit breaker is open, the second circuit breaker is closed, the first bypass breaker is open, the second bypass breaker is closed, the first and second power stages are inactive, the first and second contactors are open, and the load switch is open, and
the at least one controller is further configured to:
receive a command to perform an un-bypass operation for the static transfer switch;
determine whether the at least one removable power stage module is installed in the at least one automatic barrier assembly; and
cause the load switch to close and lock the at least one removable power stage module in place in response to (i) receiving the command to perform the un-bypass operation for the static transfer switch and (ii) determining that the at least one removable power stage module is installed.

14. The static transfer switch of claim 13, wherein the at least one controller is further configured to:
activate the second power stage; and
close the second contactor.

15. The static transfer switch of claim 14, wherein the at least one controller is further configured to:
cause the second bypass breaker to open; and
release a lock on the first circuit breaker.

16. The static transfer switch of claim 15, wherein the at least one controller is further configured to:
cause the first circuit breaker to close;
lock the second bypass breaker open; and
close the first contactor.

17. The static transfer switch of claim 13, wherein the at least one controller is further configured to:

block the un-bypass operation from being performed in response to determining that (i) a power quality of the second power source is outside of a pre-defined range or (ii) a fault condition exists at the first power stage and/or the second power stage.

18. The static transfer switch of claim 1, wherein:
the at least one removable power stage module further comprises at least one of the first and second contactors.

19. A method operable by at least one controller of a static transfer switch, wherein:
the static transfer switch comprises:
first and second inputs selectively coupled with first and second power sources via first and second circuit breakers, respectively;
an output coupled with a load;
first and second bypass breakers selectively coupling the first and second inputs, respectively, with the output;
at least one removable power stage module including first and second power stages configured to conduct electrical power when active;
first and second contactors selectively coupling the first and second inputs with the first and second power stages, respectively; and
a load switch selectively coupling the first and second power stages with the output, and
the method comprises modifying an operating state of the first and second contactors and the first and second power stages to automatically implement a bypass operation and an un-bypass operation of the static transfer switch in response to at least one trigger condition.

20. The method of claim 19, wherein:
the at least one trigger condition comprises determining that the second circuit breaker has opened, and
the method further comprises performing the bypass operation by:
opening the second contactor;
directing a closing of the first bypass breaker;
deactivating the first power stage;
opening the first contactor;
directing an opening of the load switch; and
releasing a lock on the at least one removable power stage module to allow the at least one removable power stage module to be removed from the static transfer switch.

\* \* \* \* \*